(12) United States Patent
Marjanovic et al.

(10) Patent No.: US 10,516,193 B2
(45) Date of Patent: Dec. 24, 2019

(54) BATTERY THERMAL FIN AND METHOD OF THERMAL ENERGY TRANSFER USING A THERMAL FIN

(71) Applicant: Ford Global Technologies, LLC, Dearborn, MI (US)

(72) Inventors: Mladen Marjanovic, Windsor (CA); Rajaram Subramanian, Ann Arbor, MI (US); Kimberley King, Northville, MI (US); Saravanan Paramasivam, South Lyon, MI (US); Eric Yoo, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 15/784,471

(22) Filed: Oct. 16, 2017

(65) Prior Publication Data

US 2019/0115639 A1    Apr. 18, 2019

(51) Int. Cl.
  *H01M 10/65* (2014.01)
  *H01M 10/613* (2014.01)
  *H01M 10/625* (2014.01)

(52) U.S. Cl.
  CPC ......... *H01M 10/65* (2015.04); *H01M 10/613* (2015.04); *H01M 10/625* (2015.04); *H01M 2220/20* (2013.01)

(58) Field of Classification Search
  CPC .. H01M 10/613; H01M 10/625; H01M 10/65; H01M 2220/20
  See application file for complete search history.

(56) References Cited

U.S. PATENT DOCUMENTS

| | | |
|---|---|---|
| 2012/0009455 A1 | 1/2012 | Yoon |
| 2013/0252052 A1 | 9/2013 | Dawley |
| 2014/0272517 A1 | 9/2014 | Glasgow et al. |
| 2016/0036019 A1* | 2/2016 | Gunna .............. H01M 10/6551 429/50 |
| 2016/0036020 A1* | 2/2016 | Gunna ................ H01M 10/625 429/99 |
| 2016/0218332 A1* | 7/2016 | Baek ................... H01M 2/1077 |
| 2017/0214104 A1 | 7/2017 | Garfinkel et al. |
| 2017/0237131 A1 | 8/2017 | Gunna et al. |

\* cited by examiner

*Primary Examiner* — Adam A Arciero
(74) *Attorney, Agent, or Firm* — Carlson, Gaskey & Olds, P.C.

(57) ABSTRACT

An exemplary battery assembly includes, among other things, a frame, and a thermal fin extending through an aperture in the frame. The thermal fin is configured to transfer thermal energy between a battery cell and a thermal exchange plate. An exemplary method of thermal energy transfer within a battery pack includes, among other things, transferring thermal energy between at least one battery cell and a thermal exchange plate using a thermal fin that extends through an aperture in a frame.

17 Claims, 6 Drawing Sheets

BATTERY THERMAL FIN AND METHOD OF THERMAL ENERGY TRANSFER USING A THERMAL FIN

TECHNICAL FIELD

This disclosure relates generally to a thermal fin within a battery array of an electrified vehicle. In particular, the disclosure relates to the thermal fin held within an aperture of the frame.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Traction batteries of electrified vehicles typically include a plurality of arrays each having individual battery cells that are periodically recharged to replenish the energy necessary to power the electric machines. Battery cells can heat up during charging and discharging, and during other stages of operation. Operating the battery cells at certain temperatures can improve the capacity and the life of the battery cells.

SUMMARY

A battery assembly according to an exemplary aspect of the present disclosure includes, among other things, a frame, and a thermal fin extending through an aperture in the frame. The thermal fin is configured to transfer thermal energy between a battery cell and a thermal exchange plate.

In a further non-limiting embodiment of the foregoing assembly, the frame is overmolded to the thermal fin.

In a further non-limiting embodiment of any of the foregoing assemblies, the frame is a polymer-based material, and the thermal fin is a metal or metal alloy.

In a further non-limiting embodiment of any of the foregoing assemblies, the thermal fin includes a base, a platform, and a stem extending from the base to the platform.

In a further non-limiting embodiment of any of the foregoing assemblies, the platform contacts at least one battery cell on a first side of the frame, and a base is disposed on an opposing second side of the frame. The stem extends through the frame from the base to the platform.

In a further non-limiting embodiment of any of the foregoing assemblies, the base interfaces with a thermal exchange plate through a thermal interface material.

In a further non-limiting embodiment of any of the foregoing assemblies, the platform contacts at least two battery cells.

In a further non-limiting embodiment of any of the foregoing assemblies, the platform interfaces directly with a vertical bottom of each of the at least two battery cells.

In a further non-limiting embodiment of any of the foregoing assemblies, the at least two battery cells interface directly with each other along an interfacing surface, and no portion of the thermal fin extends between the at least two battery cells to interrupt the interfacing surface.

In a further non-limiting embodiment of any of the foregoing assemblies, the at least two battery cells are adhesively secured to teach other at the interfacing surface.

In a further non-limiting embodiment of any of the foregoing assemblies, the thermal fin is a first thermal fin, and the at least two battery cells directly contact a second thermal fin that is separate and distinct from the first thermal fin.

In a further non-limiting embodiment of any of the foregoing assemblies, the assembly includes a subframe overmolded about the second thermal fin.

A method of thermal energy transfer within a battery pack according to an exemplary aspect of the present disclosure includes, among other things, transferring thermal energy between at least one battery cell and a thermal exchange plate using a thermal fin that extends through an aperture in a frame.

In a further non-limiting embodiment of the foregoing method, the frame is overmolded about a portion of the thermal fin.

A further non-limiting embodiment of any of the foregoing methods includes supporting the at least one battery cell upon a platform of the thermal fin.

In a further non-limiting embodiment of any of the foregoing methods, the at least one battery cell is at least two battery cells such that the platform supports more than one battery cell.

In a further non-limiting embodiment of any of the foregoing methods, the thermal fin interfaces with a downwardly facing surface of the at least one battery cell.

In a further non-limiting embodiment of any of the foregoing methods, the thermal fin is a first thermal fin, and the at least one battery cell includes a first battery cell. The method further includes transferring thermal energy from the first battery cell using both the first thermal fin and a second thermal fin different than the first thermal fin.

In a further non-limiting embodiment of any of the foregoing methods, the first thermal fin is overmolded within the frame, and the second thermal fin is overmolded within a second frame.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a traction battery having a battery array with at least one thermal fin. Within the battery array, the thermal fin extend through an aperture in a frame. The thermal fin transfers thermal energy between at least one battery cell and a thermal exchange plate.

Figure 1:
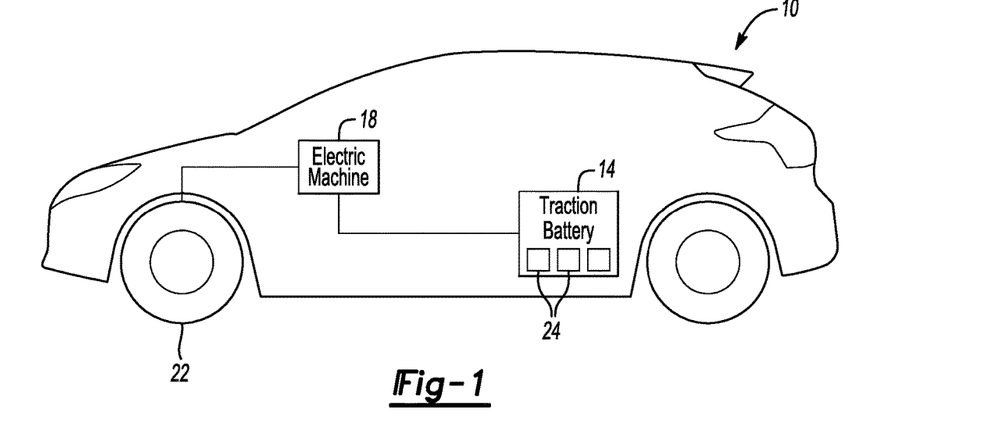
FIG. 1 illustrates a schematic view of an exemplary electrified vehicle having a traction battery.

Referring to FIG. 1, an example electrified vehicle 10 includes a traction battery 14, an electric machine 18, and a pair of vehicle drive wheels 22. The electric machine 18 can receive electric power from the battery 14. The electric machine 18 converts the electric power to torque that drives the wheels 22. The illustrated battery 14 is a relatively high-voltage battery in some embodiments when compared to, for example, an accessory battery.

The exemplary vehicle 10 is an all-electric vehicle. In other examples, the electrified vehicle 10 is a hybrid electric vehicle, which can selectively drive the wheels 22 with torque provided by an internal combustion engine instead of, or in addition to, the electric machine 18.

Figure 2:
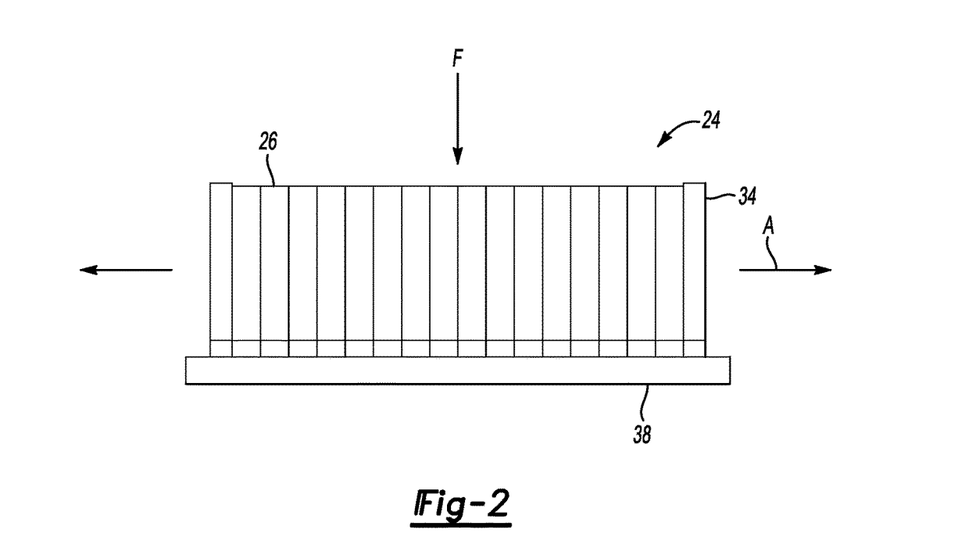
FIG. 2 illustrates a side view of an array from the traction battery of FIG. 1 according to an exemplary embodiment of the present disclosure.

Referring now to FIG. 2 with continuing reference to FIG. 1, the battery 14 includes a plurality of battery arrays 24. Each of the arrays 24 includes a plurality of individual frames 26 and battery cells 30 disposed along an axis A. The frames 26 and battery cells 30 are sandwiched axially between endplates 34. Although the example battery 14 includes a plurality of arrays 24, other example batteries could include a single array.

The frames 26 and battery cells 30 are disposed adjacent to a thermal exchange plate 38. The thermal exchange plate 38 is used to control levels of thermal energy within the battery cells 26. A fluid can, for example, circulate through channels in the thermal exchange plate 38 to take on thermal energy. The fluid can be a liquid coolant. The heated fluid is then moved away from the array 24 to cool the array. The heated fluid can move to, for example, a liquid-to-air heat exchanger, where the thermal energy is transferred from the heated fluid to ambient air.

Figure 3A:
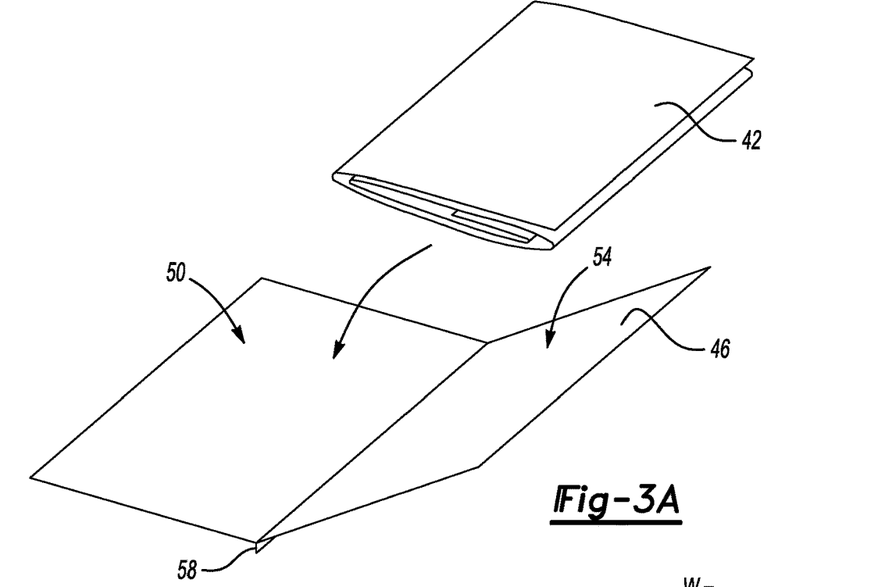
FIG. 3A illustrates a step in a process of assembling a battery cell from the array of FIG. 2.
Figure 3B:
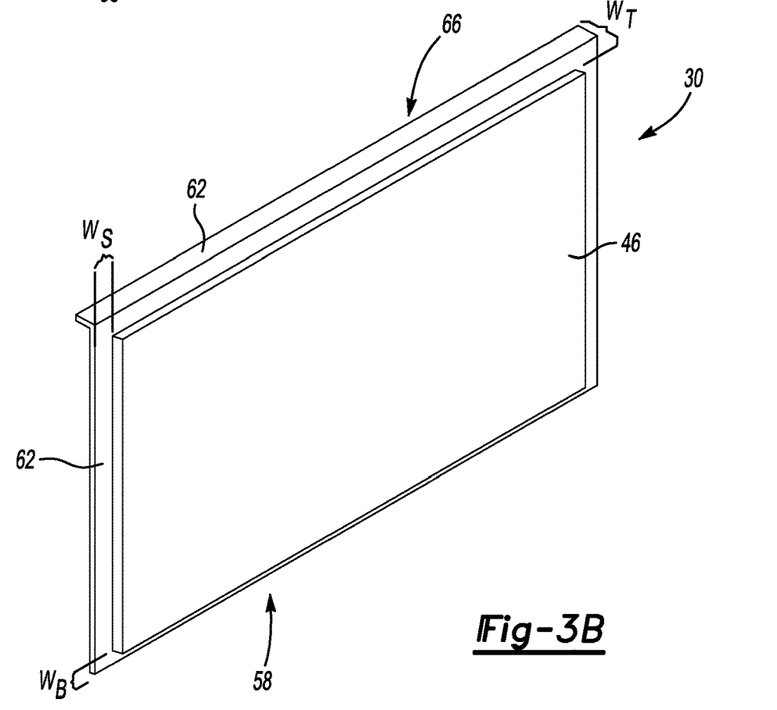
FIG. 3B illustrates the battery cell of FIG. 3A after assembly.

Referring to FIGS. 3A and 3B, the battery cells 30 of an exemplary embodiment include an electrode structure 42 held within a case 46. The battery cell 30 is, in this example, a pouch-type lithium-ion battery cell, and the electrode structure 42 has a jelly-roll (i.e., wound) configuration. Other types of battery cells could be used in other examples.

To assemble the battery cell 30, the electrode structure 42 is placed within the case 46, which can include a first side 50 and a second side 54 connected at a hinged area 58. The first side 50 and the second side 54 are then folded about the electrode structure 42 to substantially enclose the electrode structure 42. Next, the outer edges of the first side 50 are sealed to the outer edges of the second side 54. A seam 62 extends circumferentially about a perimeter of the battery cell 30. Terminals (not shown) can extend through the seam 62 to electrically connect the electrode structure 42 with, for example, a busbar assembly.

Generally, the hinged area 58 is considered a bottom of the battery cell 30, and a side 66 opposite the hinged area 58 is considered a top of the battery cell 30. A width $W_T$ of the seam 62 along the top of the battery cell 30 is greater than a width $W_B$ of the seam 62 along the hinged area 58 at the bottom of the battery cell 30. A width $W_S$ of the seam 62 along the lateral sides of the battery cell 30 is greater than the width $W_B$ of the seam 62 along the hinged area 58.

The battery cell 30 can heat up during charging and discharging, as well as during other stages of operation.

Figure 4:
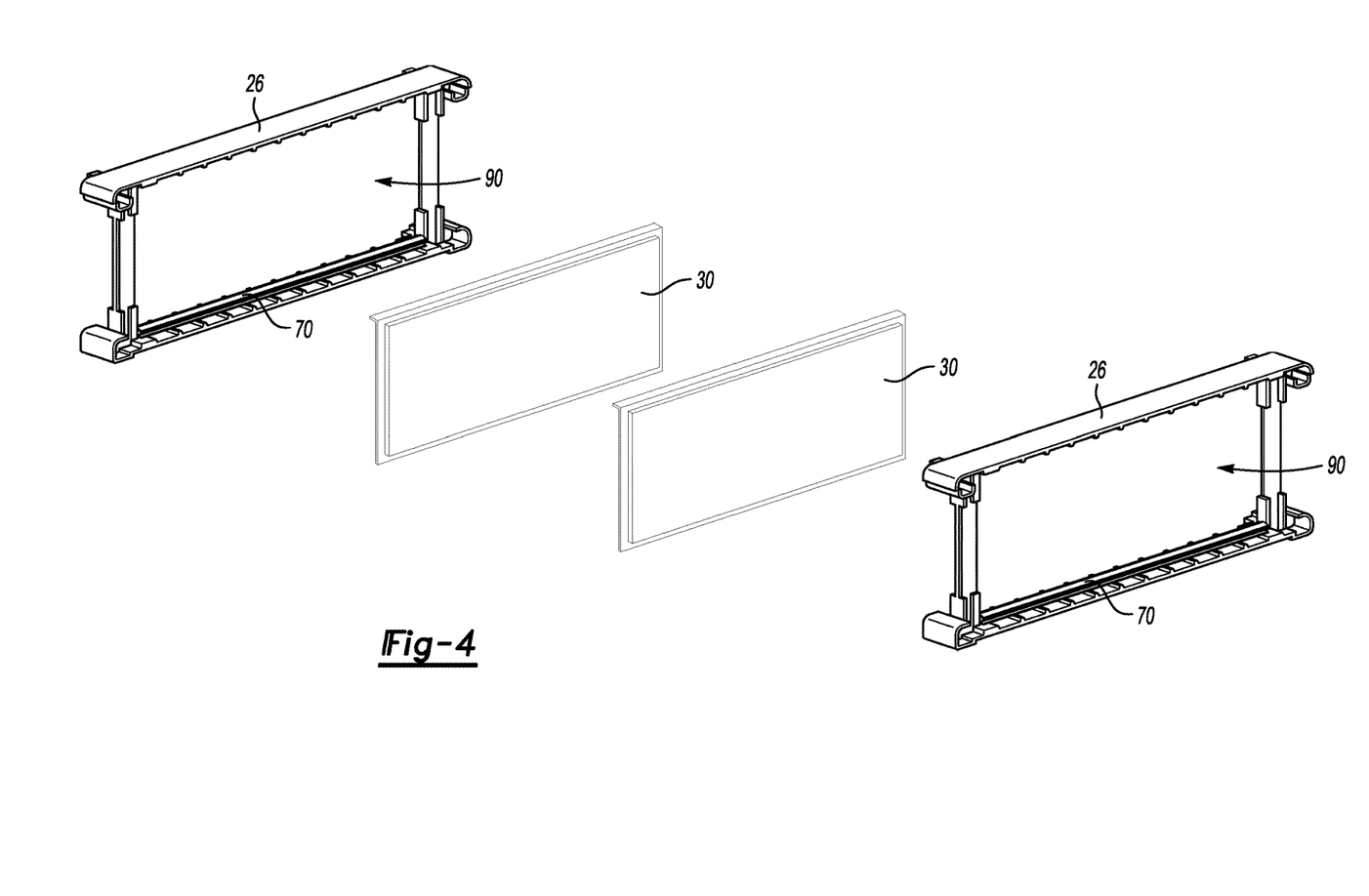
FIG. 4 illustrates an expanded view of a selected portion of the array of FIG. 2.
Figure 5:
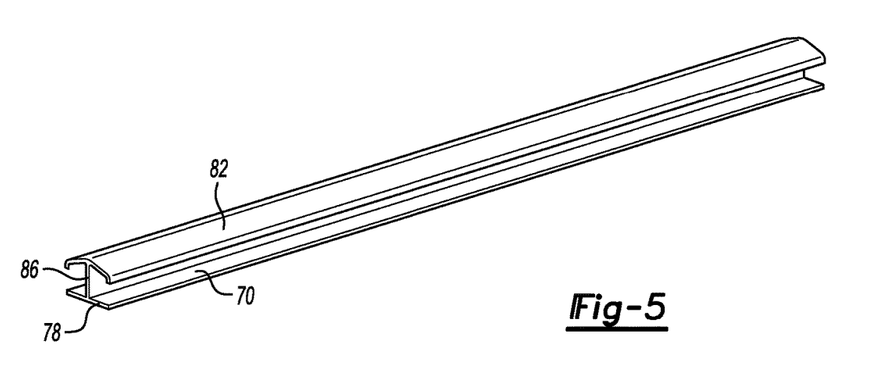
FIG. 5 illustrates a perspective view of a thermal fin from the array of FIG. 2.
Figure 6:
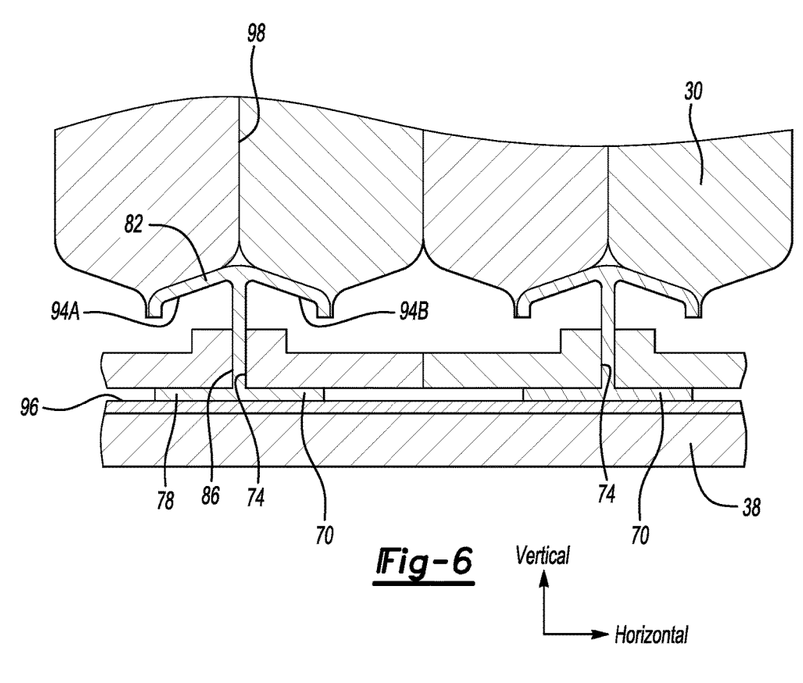
FIG. 6 illustrates a close-up section view of thermal fins from the traction battery of FIG. 2 interfacing with battery cells and a thermal exchange plate.

Referring now to FIGS. 4-6 with continuing reference to FIGS. 2-3B, the array 24 uses thermal fins 70 to facilitate transfer of thermal energy between the battery cells 30 and thermal exchange plate 38.

In this exemplary embodiment, the thermal fins 70 each extend through an aperture 74 in an associated frame 26. The example thermal fins 70 each include a base 78, a platform 82, and a stem 86 extending from the base 78 to the platform 82.

The thermal fins 70 can be a metal or metal alloy material to facilitate transferring thermal energy. In one specific embodiment, the thermal fins 70 are aluminum. The thermal fins 70 can be manufactured using several processes. In one specific example, the thermal fins 70 are extruded, which can reduce costs and complexity of manufacturing the thermal fins 70 when compared with other manufacturing processes. The exemplary thermal fins 70 are about 1 millimeter thick.

The frames 26, in the exemplary embodiment, are a polymer-based material. To position one of the thermal fins 70 such that the thermal fin 70 extends through the aperture 74, the frame 26 can be overmolded about the thermal fin 70. That is, the thermal fin 70 can be positioned within an area of a die cavity. A material then injected into the die cavity to form the frame 26. The material cures to provide the frame 26 within the die. Once cured, the thermal fin 70 is held within the frame 26 such that the stem 86 extends through the aperture 74 in the frame 26.

In this example, the thermal fins 70 are positioned such that the platform 82 faces an opening 90 provided by the frame 26. The base 78, in contrast to the platform 82, faces away from the opening 90.

When the array 24 is assembled, the battery cells 30 interface with the platforms 82 of the thermal fins 70 (FIG. 5). In particular, one of the battery cells 30 rests upon a first side 94A of the platform 82, and another of the battery cells 30 rests upon a second side 94B of the platform 82. The outboard edges of the first side 94A and the second side 94B can be turned downward to facilitate thermal contact with the seam 62 along the hinged area 58 at the bottom of the battery cell 30. Each of the battery cells 30 interfaces with one thermal fin 70 in this example.

Also, in this exemplary embodiment, the thermal fin 70 is positioned vertically below the battery cells 30 such that gravity urges the battery cells 30 into contact with the platform 82. The weight of the battery cells 30 thus assists in maintaining robust thermal contact between the platform 82 of the thermal fin 70 and the battery cells 30.

Also, positioning the thermal fin 70 vertically below the battery cells 30 causes the thermal fin 70 to interface with the hinged area 58, which is the side of the battery cells 30 having the seam 62 with the smallest width $W_B$. Interfacing the thermal fin 70 with the side of the battery cells 30 having the smallest seam 62 lessens the chance for the seam 62 to interfere with thermal transfer between the battery cells 30 and the thermal fin 70.

Vertical and horizontal, for purposes of this disclosure, is with reference to ground or the normal orientation of the array 24 during operation of the vehicle 10.

In another embodiment, the smallest seam 62 is at a vertical top of the battery cell 30 and the thermal fin 70 is repositioned to reside in a vertical top of the frame 26 so that the thermal fin 70 can interface with the side of the battery cell 30 having the smallest seam 62.

The base 78, which is positioned outside an outer periphery of the frame 26, thermally interfaces with the thermal exchange plate 38. A layer of a thermal interface material (TIM) 96 can be used to enhance thermal conductivity at the interface between the bases 48 and a thermal exchange plate 38.

In the exemplary embodiment, thermal energy from the battery cells 30 can move from the battery cells 30 to the platform 82, which cools the battery cells 30. Thermal energy then moves through the stem 86, to the base 78. From the base 78, thermal energy moves to the thermal exchange plate 38, through the TIM 96.

Fluid within channels of the thermal exchange plate 38 then heats and is communicated away from the thermal exchange plate 38

Within the array 24, the battery cells 30 interface with each other at axially interfacing surfaces 98. An adhesive, such as an adhesive tape, can be used at the axially interfacing surfaces 98 to secure axially adjacent battery cells 30 to one another.

Figure 9:
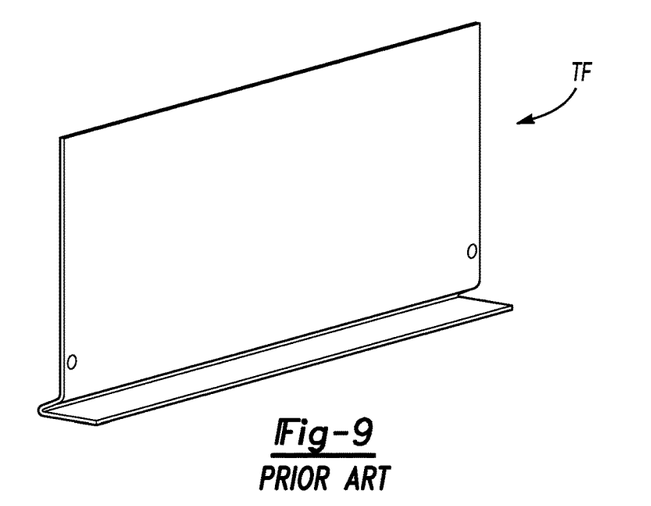
FIG. 9 illustrates a prior art thermal fin.
Figure 10:
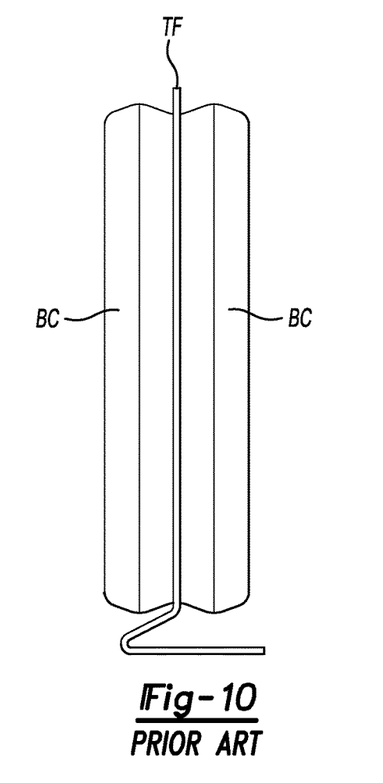
FIG. 10 illustrates the prior art thermal fin of FIG. 9 within a selected portion of a prior art array.

In the prior art, thermal fins T extend between axially interfacing surfaces of battery cells BC as shown in FIGS. 9 and 10. Areas of the prior art thermal fins T are thus sandwiched between the battery cells BC. The prior art thermal fins T are stamped, not extruded.

In the exemplary embodiment of FIGS. 3-6, however, no portion of the thermal fin 70 extends into the area of the interfacing surfaces 98. This can, among other things, reduce an overall axial length of the array 24 when compared to arrays of the prior art having thermal fins.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Figures 7, 8:
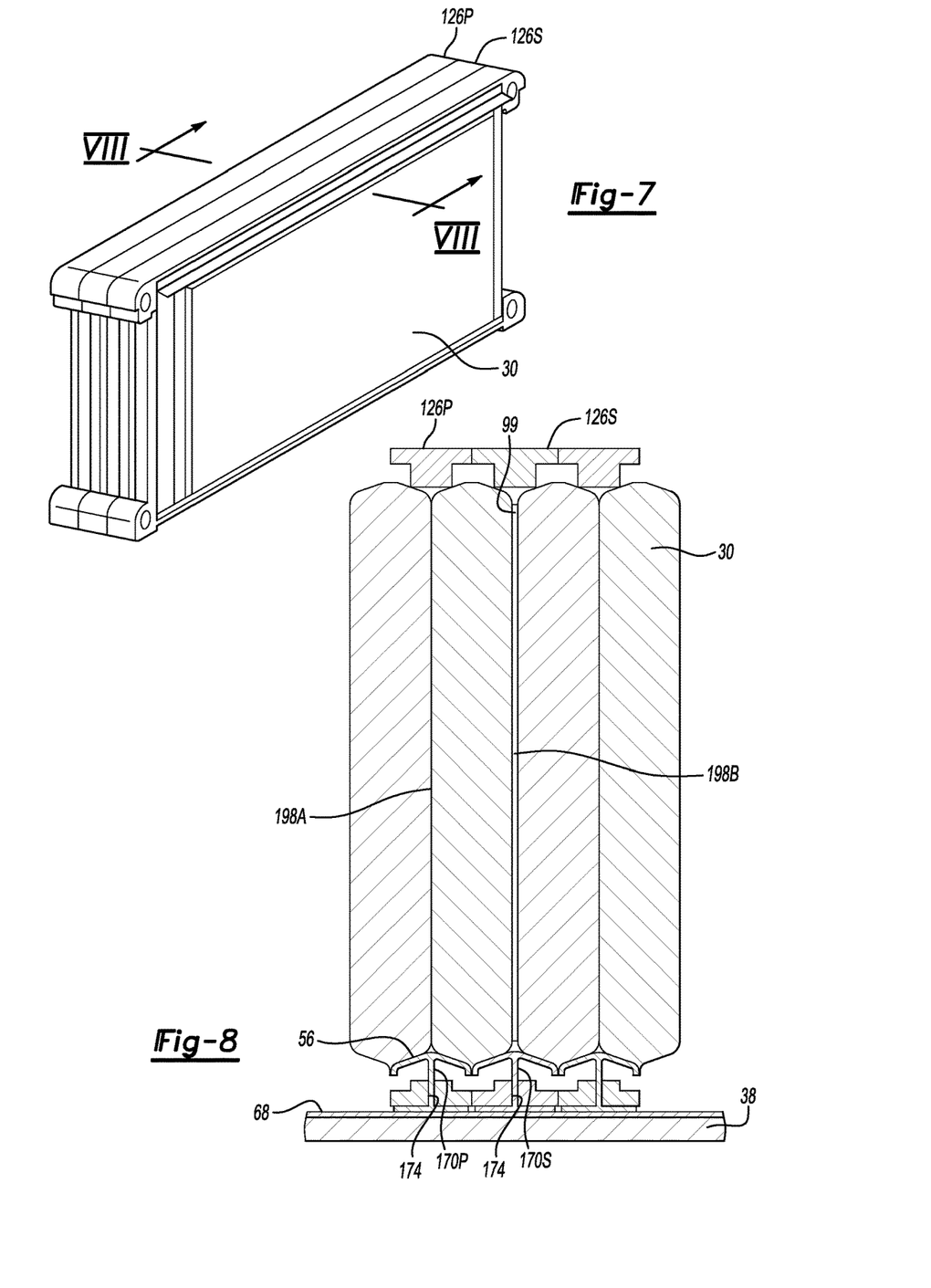
FIG. 7 illustrates a portion of a array according to another exemplary embodiment of the present disclosure.
FIG. 8 illustrates a section taken at line VIII-VIII in FIG. 7.

Referring now to FIGS. 7 and 8, a portion of an array according to another exemplary embodiment includes primary frames 126P and subframes 126S. A thermal fin 170P extends through an aperture 174P in one of the primary frames 126P. A thermal fin 170S extends through an aperture 174S in one of the subframes 126S. The primary frame 126P can be overmolded to the thermal fin 170P, and the subframe 126S can be overmolded to the thermal fin 170S.

At least some of the battery cells 30 held by the primary frames 126P and the subframes 126S are supported upon both the platform 56 of the thermal fin 170P and the platform 56 of the second thermal fin 170S. The battery cells 30, in the embodiment of FIGS. 7 and 8, can thus convey thermal energy to the thermal exchange plate 38 through more than one thermal fin.

A first axially facing side 198A of the battery cells 30 can directly interface with an axially facing side of an axially adjacent battery cell, and be secured to the axially adjacent battery cell through the use of an adhesive.

An opposite axially facing side 198B of the battery cells 30, can interface with an axially adjacent battery cell 30 through a foam member 99. The foam member 99 can urge the battery cells 30 axially toward each other at the interfaces 172A.

Some features of the disclosed embodiments can include a thermal fin that is relatively reduced in size when compared to other types of cooling fins since the cooling fin does not extend between axially facing surfaces of the battery cells.

In some specific examples where a battery array includes thirty-two battery cells, usage of the cooling fins in the embodiment of FIG. 2-5, can reduce an overall weight of the array by about 1.4 kilograms. The reduction can be due to the reduced weight of the thermal fins 70, which can be about 29 grams. This reduction is when the battery array is compared to a battery array using prior art thermal fins TC that extend from a bottom of the battery cells to a top of the battery cells as shown in FIGS. 9 and 10. The prior art thermal fins TC can weigh about 121 grams.

If the embodiment of FIGS. 6 and 7 is utilized, the weight reduction can be about 0.9 kilograms for an array including thirty-two battery cells when compared to an array using the prior art thermal fins TC of FIGS. 9 and 10

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
   a frame; and
   a thermal fin extending through an aperture in the frame, the thermal fin configured to transfer thermal energy between a battery cell and a thermal exchange plate, the thermal fin including a base, a platform, and a stem extending from the base to the platform,
   wherein the platform contacts at least one battery cell on a first side of the frame, and the base is disposed on an opposing, second side of the frame, the stem extending through the aperture of the frame from the base to the platform.

2. The assembly of claim 1, wherein the frame is overmolded to the thermal fin.

3. The assembly of claim 1, wherein the frame is a polymer-based material, and the thermal fin is a metal or metal alloy.

4. The assembly of claim 1, wherein the base interfaces with a thermal exchange plate through a thermal interface material.

5. The assembly of claim 1, wherein the platform contacts at least two battery cells.

6. The assembly of claim 5, wherein the platform interfaces directly with a vertical bottom of each of the at least two battery cells.

7. The assembly of claim 6, wherein the at least two battery cells interface directly with each other along an interfacing surface, and no portion of the thermal fin extends between the at least two battery cells to interrupt the interfacing surface.

8. The assembly of claim 7, wherein the at least two battery cells are adhesively secured to each other at the interfacing surface.

9. The assembly of claim 5, wherein the thermal fin is a first thermal fin, wherein one of the at least two battery cells directly contacts a second thermal fin separate and distinct from the first thermal fin.

10. The assembly of claim 9, further comprising a subframe overmolded about the second thermal fin.

11. A method of thermal energy transfer within a battery pack, comprising:
   transferring thermal energy between at least one battery cell and a thermal exchange plate using a thermal fin that extends through an aperture in a frame
   wherein the thermal fin includes a base, a platform, and a stem extending from the base to the platform,
   wherein the platform contacts at least one battery cell on a first side of the frame, and the base is disposed on an opposing, second side of the frame.

12. The method of claim 11, wherein the frame is overmolded about a portion of the thermal fin.

13. The method of claim 11, further comprising supporting the at least one battery cell upon a platform of the thermal fin.

14. The method of claim 13, wherein the at least one battery cell is at least two battery cells such that the platform supports more than one battery cell.

15. The method of claim 13, wherein the thermal fin interfaces with a downwardly facing surface of the at least one battery cell.

16. The method of claim 11, wherein the thermal fin is a first thermal fin, and the at least one battery cell includes a first battery cell, and further comprising transferring thermal energy from the first battery cell using the first thermal fin and a second thermal fin different than the first thermal fin.

17. The method of claim 16, wherein the first thermal fin is overmolded within the frame, and the second thermal fin is overmolded within a second frame.

* * * * *